US012263502B1

(12) United States Patent
Best

(10) Patent No.: US 12,263,502 B1
(45) Date of Patent: Apr. 1, 2025

(54) PAINT ROLLER WITH TRIM GUARD

(71) Applicant: Elgin Best, Hallsboro, NC (US)

(72) Inventor: Elgin Best, Hallsboro, NC (US)

( * ) Notice: Subject to any disclaimer, the term of this patent is extended or adjusted under 35 U.S.C. 154(b) by 300 days.

(21) Appl. No.: 17/890,896

(22) Filed: Aug. 18, 2022

(51) Int. Cl.
*B05C 17/00* (2006.01)
*B05C 17/02* (2006.01)
*A46B 17/08* (2006.01)

(52) U.S. Cl.
CPC .......... *B05C 17/0225* (2013.01); *A46B 17/08* (2013.01); *B05C 17/00* (2013.01)

(58) Field of Classification Search
CPC ........ B05C 17/023; B05C 17/02; A46B 17/08
See application file for complete search history.

(56) References Cited

U.S. PATENT DOCUMENTS 2,735,128 A * 2/1956 Adams .................. B05C 17/022 118/208
3,058,145 A * 10/1962 Hegedus ............. B05C 17/0357 D4/114
3,139,891 A * 7/1964 Faustman ............. B44D 3/006 134/900
3,175,241 A * 3/1965 Singleton ................ B05C 17/02 15/230.11
3,409,929 A * 11/1968 Sandor .................. B05C 17/023 15/230.11
3,538,532 A * 11/1970 Shortino ............. B05C 17/0222 118/504
3,654,658 A * 4/1972 Kovacs ............... B05C 17/0222 401/15
4,011,622 A * 3/1977 Gillum ................ B05C 17/0222 15/248.2
4,063,325 A * 12/1977 Lizak .................. B05C 17/0222 15/230.11
4,254,529 A * 3/1981 Cooke ................ B05C 17/0222 D4/122
4,569,099 A * 2/1986 Harding ................. B44D 3/006 134/182
4,667,363 A * 5/1987 Calvert ............... B05C 17/0222 134/900
4,765,353 A * 8/1988 Rhoades ............. B05C 17/0222 68/213
4,821,362 A * 4/1989 Kolb ................... B05C 17/0222 401/15
5,090,085 A * 2/1992 Jarecki ................ B05C 17/0222 401/15
5,400,459 A * 3/1995 Jarecke ............... B05C 17/0222 401/15

(Continued)

FOREIGN PATENT DOCUMENTS

GB 2179569 A * 3/1987 ........... B05C 17/022

*Primary Examiner* — Michael D Jennings
(74) *Attorney, Agent, or Firm* — Sanchelima & Associates, P.A.; Jesus Sanchelima; Christian Sanchelima

(57) ABSTRACT

A paint roller with trim guard including a handle assembly, a roller assembly, and a shield assembly. The handle assembly includes a handle. The roller assembly includes a roller. The roller is connected to the handle. The roller is dipped in paint. The roller absorbs paint. The roller is capable of painting a predetermined surface. The shield assembly includes a shield. The shield is pivotally attached to the roller to protect the top portion, the left portion, and the right portion of the roller from accidentally painting trim.

8 Claims, 3 Drawing Sheets

(56) References Cited

U.S. PATENT DOCUMENTS

| | | | | |
|---|---|---|---|---|
| 5,614,021 | A * | 3/1997 | Catlin | B44D 3/006 134/900 |
| 5,960,511 | A * | 10/1999 | Boyce | B05C 17/022 15/230.11 |
| 6,687,945 | B2 | 2/2004 | Robinson | |
| 6,739,017 | B1 * | 5/2004 | Johnson | B05C 17/0222 15/230.11 |
| 7,181,802 | B2 * | 2/2007 | Kosick | B05C 17/0222 15/230.11 |
| 7,325,557 | B2 * | 2/2008 | Wallace, III | A46B 17/06 134/900 |
| 7,624,744 | B2 * | 12/2009 | Wallace | B44D 3/006 134/140 |
| 8,434,192 | B2 * | 5/2013 | Dondurur | B05C 17/0222 15/230.11 |
| 9,272,304 | B1 * | 3/2016 | Emery | B44D 3/225 |
| 2002/0194691 | A1 * | 12/2002 | Meyer | B05C 17/02 15/230.11 |
| 2006/0272683 | A1 * | 12/2006 | Wallace | B44D 3/128 134/900 |

* cited by examiner

PAINT ROLLER WITH TRIM GUARD

II. BACKGROUND OF THE INVENTION

1. Field of the Invention

The present invention relates to a paint roller with trim guard and, more particularly, to a paint roller with trim guard that protects the trim of a house from being painted.

2. Description of the Related Art

Several designs for paint rollers have been designed in the past. None of them, however, include a deployable shield to prevent the paint roller from accidentally painting the trim.

Applicant believes that a related reference corresponds to U.S. Pat. No. 6,687,945 issued for a paint roller apparatus with a pivotally attached arm accessory that supports a paint guard. Applicant believes that another related reference corresponds to U.S. Pat. No. 9,272,304 issued for an edging attachment for a paint roller that is comprised of a selectively deployed shield that protects surfaces from coming in contact with paint. None of these references, however, teach of a paint roller with a trim guard that is comprised of a painting tool with a handle, a paint roller, and a pivotally attached shield that can be deployed over the edge of the roller and used to shield the trim from having paint applied.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a paint roller with trim guard that includes a paint roller which rotates to paint in walls or any suitable surface.

It is another object of this invention to provide a paint roller with a trim guard that includes a pivoting member which allows the guard to rotate to protect the paint roller in a closed configuration or allow it to add paint to the roller in an open configuration.

It is still another object of the present invention to provide a paint roller with trim guard that includes a trim guard which allows to paint on the edges of the trim without painting the trim which saves time from the technique or foil with tape the trim.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
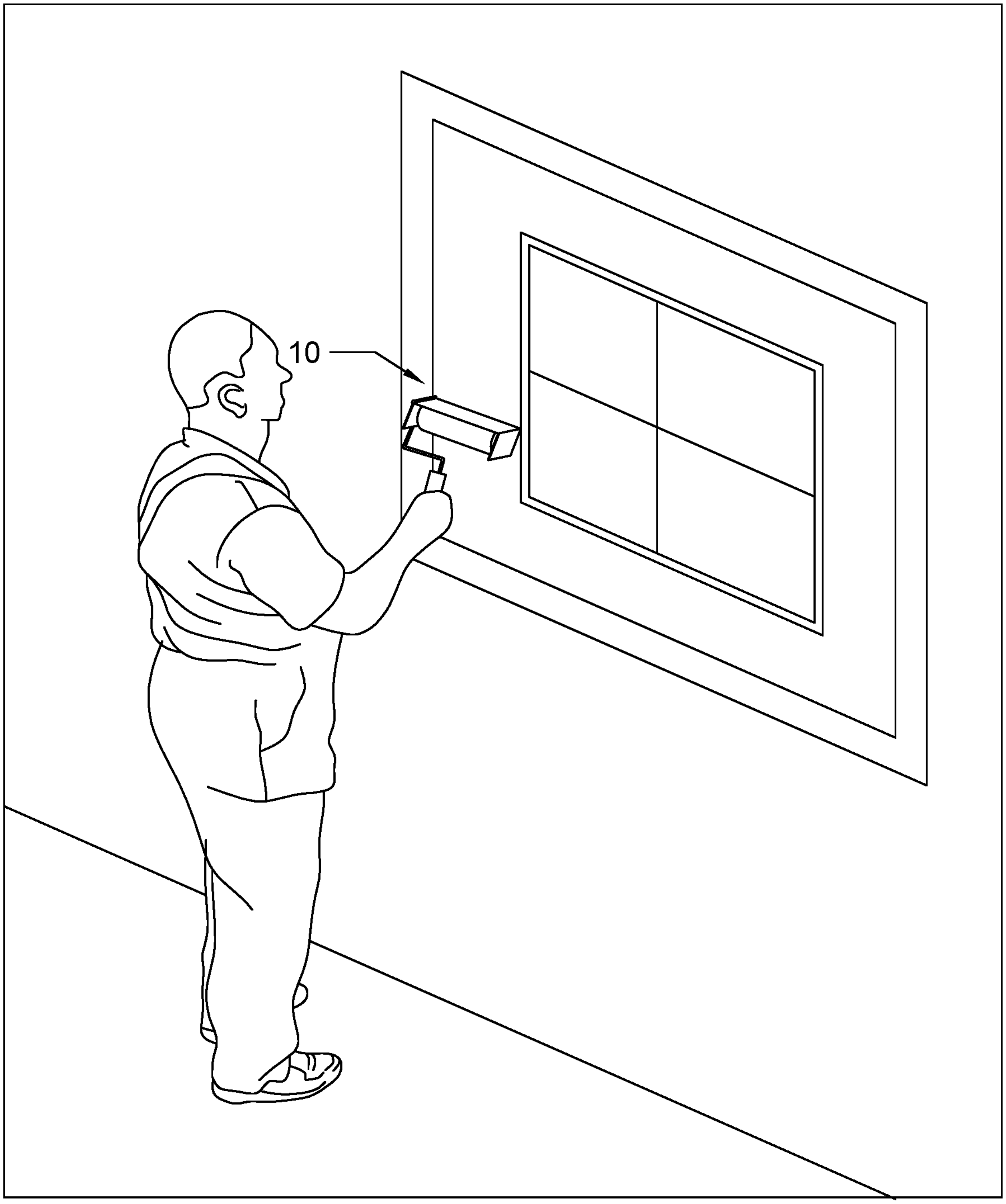
FIG. 1 represents an isometric operational view of the present invention 10 wherein a user is painting around the trim.

Referring now to the drawings, where the present invention is generally referred to with numeral 10, it can be observed that it basically includes a handle assembly 20, a roller assembly 40 and a shield assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
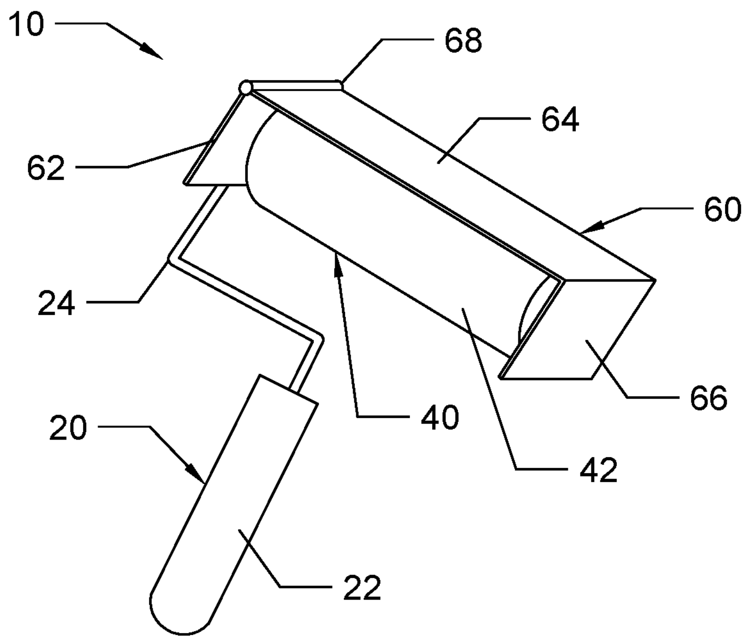
FIG. 2 shows an isometric view of the present invention having the shield assembly 60 in a closed configuration.

The handle assembly 20 may include a handle 22 and a connecting element 24. The handle 22 may have a semicircular elongated shape. It also may be suitable for the handle 22 to have a rectangular shape, a tapered shape, or any other suitable shape. The handle 22 may have such a shape that allows easy handling of the present invention 10. The handle 22 may be made of plastic, metal, wood, or any other suitable material. The uppermost end of the handle 22 may be attached to the connecting element 24. The connecting element 24 may connect the handle assembly 20 and the shield assembly 60. The connecting element 24 may be a tubular element. The connecting element 24 may have a bottom portion, a central portion and a top portion. The bottom portion, the top portion, and the central portion of the connecting element 24 may have a cylindrical shape. It also may be suitable for the bottom portion, the top portion, and the central portion of the connecting element 24 to have a rectangular shape, a triangular shape, or any other suitable shape. The bottom portion of the connecting element 24 may be vertically and collinearly connected to the handle 22. The central portion of the connecting element 24 may be perpendicular to the bottom portion of the connecting element 24. The top portion of the connecting element 24 may be perpendicular to the central portion of the connecting element defining an offset element. The top portion of the connecting element 24 may be connected to the shield assembly 60. Thus, the roller assembly 40 and the shield assembly 60 may be separated a predetermined distance from the handle 22, as best illustrated in FIG. 2. The connecting element 24 may be of metal. It also may be suitable for the connecting element 24 to be made of plastic, wood, or any other suitable material.

The roller assembly 40 may include a roller cover 42, a roller frame 44, a shaft **44*b* and caps 44*a*. The roller cover 42 may have a cylindrical shape. The roller cover 42 may be hollow. The roller cover 42 may have an opening which horizontally goes through the roller cover 42. The roller cover 42 may be made of nylon, polyester, mohair, wool, or any other suitable material. The roller cover 42 may be an absorbent element. The roller cover 42 may be suitable to be dipped in paint. The roller cover 42 may absorb paint. The roller cover 42 may be attached to the roller frame 44. The roller cover 42 may be detachable from the roller frame. The roller cover 42 may be removed from the roller assembly 40** to be washed.

The roller frame 44 may be concentrically attached to the shaft 44*b*. The roller frame 44 may be made of plastic. One end of the shaft 44*b* may be attached to the shield assembly 60. The roller frame 44 may rotate around the shaft 44*b*. Thus, the roller cover 42 may rotate around the shaft 44*b*. The roller frame 44 may be perpendicular with respect to the handle 22. The roller cover 42 may be secured to the shaft 44*b* and the roller frame 44 through caps 44*a*. The roller cover 42 may have a distal end and a proximal end. The proximal end of the roller cover 42 may be in abutting contact with the shield assembly 60. The caps 44*a* may be introduced in the distal and proximal end of the roller cover 42. The caps 44*a* may have a circular shape. It also may be suitable for the caps 44*a* to have a rectangular shape, a triangular shape, or any other suitable shape. In a preferred embodiment the user may dip the roller cover 42 arranged in the shaft 44*b*. The roller cover 42 may absorb paint. The roller cover 42 may be rotated over a wall, ceiling, or any other suitable surface to deposit the absorbed paint over and paint the surface.

Figure 4:
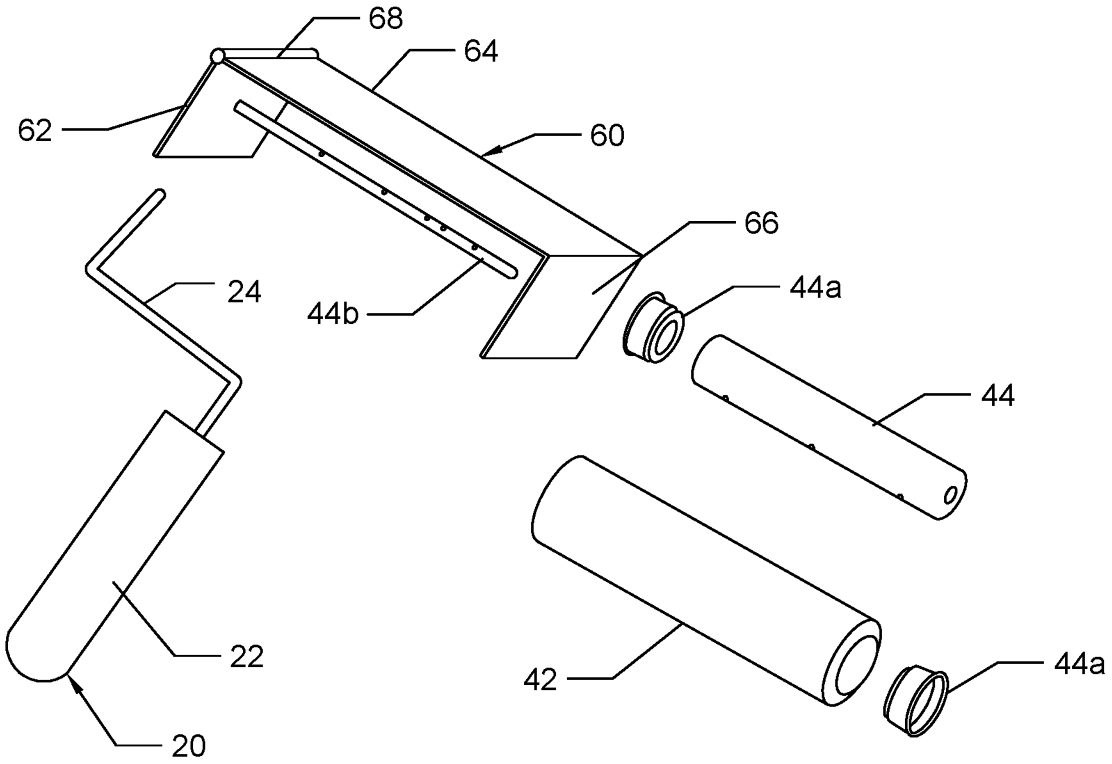
FIG. 4 is a representation of an exploded view of the present invention 10.

The shield assembly 60 may include a left wall 62, a top wall 64, a right wall 66 and a pivoting element 68. The left wall 62 may be attached to the connecting element 24. As best illustrated in FIG. 4 the shaft 24*b* may be attached to the left wall 62. The shaft 24*b* may be perpendicular to the left wall. The left wall 62 may have a rectangular shape. It also may be suitable for the left wall 62 to have a circular shape, a triangular shape, a semicircular shape, or any other suitable shape. The left wall 62 may be made of plastic, wood, metal, or any other suitable material. The left wall 62 may protect the roller cover 42 to accidentally paint the trim in a house or any other surface that can be accidentally painted.

Figure 3:
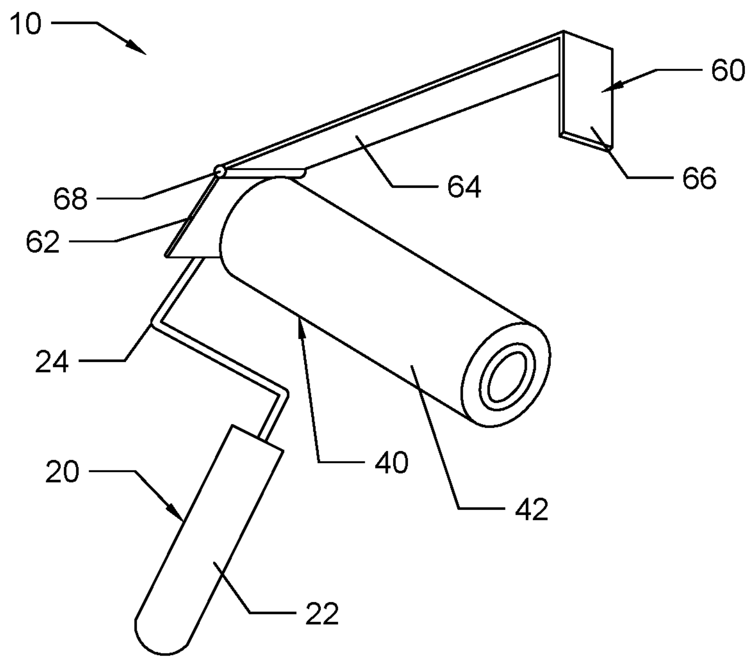
FIG. 3 illustrates an isometric view of the present invention having the shield assembly 60 in an open configuration.

The top wall 64 may be pivotally connected to the left wall 62 through the pivoting element 68. The top wall 64 may have a rectangular elongated shape. It also may be suitable for the top wall 64 to have a circular shape, an oval shape, a triangular shape, a tubular shape, or any other suitable shape. The top wall 64 may be made of metal, plastic, or any other suitable material. The top wall 64 may rotate with respect to the left wall. As best illustrated in FIG. 2 the top wall 64 may be perpendicular to the left wall 62. The top wall 64 may rotate from a closed configuration to an open configuration. The top wall 64 may be located over the roller cover 42 in a closed configuration. As best illustrated in FIG. 3 the top wall 64 may be taken apart from the top of the roller cover 42. In a closed configuration the top wall 64 may protect the trim from accidentally being painted for a top portion of the roller cover 42. The left wall 66 may be perpendicular to the top wall 64. The left wall 66 may be attached to the top wall. The left wall 66 may have a rectangular shape. It also may be suitable for the left wall 646 to have a circular shape, a triangular shape, or any other suitable shape. The left wall 66 may be made of metal, plastic, or any other suitable material. The left wall 66 may prevent the left portion of the roller cover from accidentally painting the trim in a house or any other surface. In a preferred embodiment the roller cover 42 may be dipped in paint in an open configuration of the shield assembly 60 and then taken into closed configuration to prevent accidentally painting surfaces with the left, top and left edges of the roller cover 42.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A paint roller with trim guard, comprising:

a handle assembly, wherein said handle assembly includes a handle;

a roller assembly wherein said roller assembly includes a roller, said roller is connected to said handle, said roller is capable of be dipped in paint, said roller rotates to deposit paint in a predetermined surface; and a shield assembly, wherein said shield assembly includes a shield including a top wall, a right wall and a left wall, said shield is pivotally attached to said roller, wherein said top wall is pivotally connected to said left wall allowing said top wall to rotate respect to the left wall from an open shield configuration to a closed shield configuration to cover a length of said roller, wherein the closed shield configuration has the top wall parallel to the length of the roller, said closed shield configuration covers a top edge, a left edge, and a right edge of said roller, said top wall is entirely flat.

2. The paint roller with trim guard set forth in claim 1, wherein said right wall is perpendicular to said top wall.

3. The paint roller with trim guard set forth in claim 1, wherein said top wall, said right wall and said left wall are planar.

4. The paint roller with trim guard set forth in claim 1, wherein said handle is connected to said left wall by a connecting element, said connecting element is offset with respect to said handle, said connecting element is a tubular element.

5. The paint roller with trim guard set forth in claim 1, wherein said roller has a cylindrical shape, said roller has a shaft, said shaft is connected to said shield, said roller rotates around said shaft.

6. The paint roller with trim guard set forth in claim 5, wherein said roller includes caps, wherein said caps are inserted in the distal and proximal ends of said roller to secure said roller in said shaft.

7. A paint roller with trim guard, comprising:

a handle assembly, wherein said handle assembly includes a handle;

a roller assembly wherein said roller assembly includes a roller, said roller is connected to said handle, said roller is capable of be dipped in paint, said roller rotates to deposit paint in a predetermined surface; and a shield assembly, wherein said shield assembly includes a shield, said shield has a top wall, a left wall and a right wall, said top wall is entirely flat, said left wall is attached to said handle, said top wall, said left wall, said top wall and said right wall are planar, wherein said top wall is pivotally connected to said left wall allowing said top wall to rotate respect to the left wall from an open shield configuration to a closed shield configuration to cover a length of said roller, wherein the closed shield configuration has the top wall parallel to the length of the roller, said shield is covers a top edge, a left edge, and a right edge of said roller.

8. A paint roller with trim guard, consisting of:

a handle assembly, wherein said handle assembly includes a handle and a connecting element, said connecting element is a tubular element, said connecting element is offset of said handle;

a roller assembly wherein said roller assembly includes a roller and caps, said roller includes a shaft, said roller is configured to rotate around said shaft, said caps are inserted in a proximal and distal end of said roller to fix said roller to said shaft, said roller is capable of be dipped in paint, said roller rotates to deposit paint in a predetermined surface; and a shield assembly, wherein said shield assembly includes a shield, said shield has a top wall, a left wall and a right wall, said top wall is entirely flat, said left wall is attached to said handle by means of said connecting element, said shaft is perpendicularly connected to said left wall, said top wall, said left wall, said top wall and said right wall are planar, said right wall is perpendicularly attached to said top wall, wherein said top wall is pivotally connected to said left wall allowing said top wall to rotate orthogonally respect to the left wall from an open shield configuration to a closed shield configuration to cover a length of said roller wherein the closed shield configuration has the top wall parallel to the length of the roller said left wall is perpendicular to said top wall in said closed configuration, said closed shield configuration covers a top edge, a left edge, and a right edge of said roller.

* * * * *